United States Patent [19]

Tsutomu et al.

[11] Patent Number: 4,538,179
[45] Date of Patent: Aug. 27, 1985

[54] IMAGE PROCESSING FOR UNSHARP MASKING OF IMAGE

[75] Inventors: Kimura Tsutomu; Hideo Nakayama; Yuichi Fuseda, all of Kanagawa, Japan

[73] Assignee: Fuji Photo Film Co., Ltd., Kanagawa, Japan

[21] Appl. No.: 493,555

[22] Filed: May 11, 1983

[30] Foreign Application Priority Data

May 19, 1982 [JP] Japan ................................ 57-84571

[51] Int. Cl.³ .......................... H04N 5/30; H04N 1/40
[52] U.S. Cl. .................................... 358/166; 358/111; 364/414
[58] Field of Search .................. 358/166, 160, 21 R, 358/37, 244, 280, 284, 296, 111; 378/99, 162, 901; 364/414, 415; 250/363 R, 363 SR, 362

[56] References Cited

U.S. PATENT DOCUMENTS 4,317,179  2/1982  Kato .................................... 364/414
4,346,406  8/1982  Kato .................................... 358/111
4,346,409  8/1982  Ishida .................................. 364/414

Primary Examiner—Tommy P. Chin
Attorney, Agent, or Firm—Sughrue, Mion, Zinn, Macpeak & Seas

[57] ABSTRACT

Unsharp masking operations of original video signals are performed by a couple of processor systems (100, 200), which are interconnected in cascades logically to share the burden of the operations. One processor system (100) in the preceding stage executes a part of unsharp masking operations by accumulating the original video signals with respect to the pixels involved in an original image to transfer the resultant data together with the associated original video signals to the other processor system (200) in the subsequent stage. The other processor system (200) receives those data and proceeds the remaining operations required for the unsharp masking operations including averaging by simple or weighted addition. Those operations are executed with respect to all unsharp masks involved in the original image. Since the one processor system (100) shares the unsharp masking operations with the other processor system (200), the total operational speed is increased approximately twice as much as an image processing system composed of a single-processor system, giving rise to a real-time processing of unsharp masking of images.

4 Claims, 6 Drawing Figures

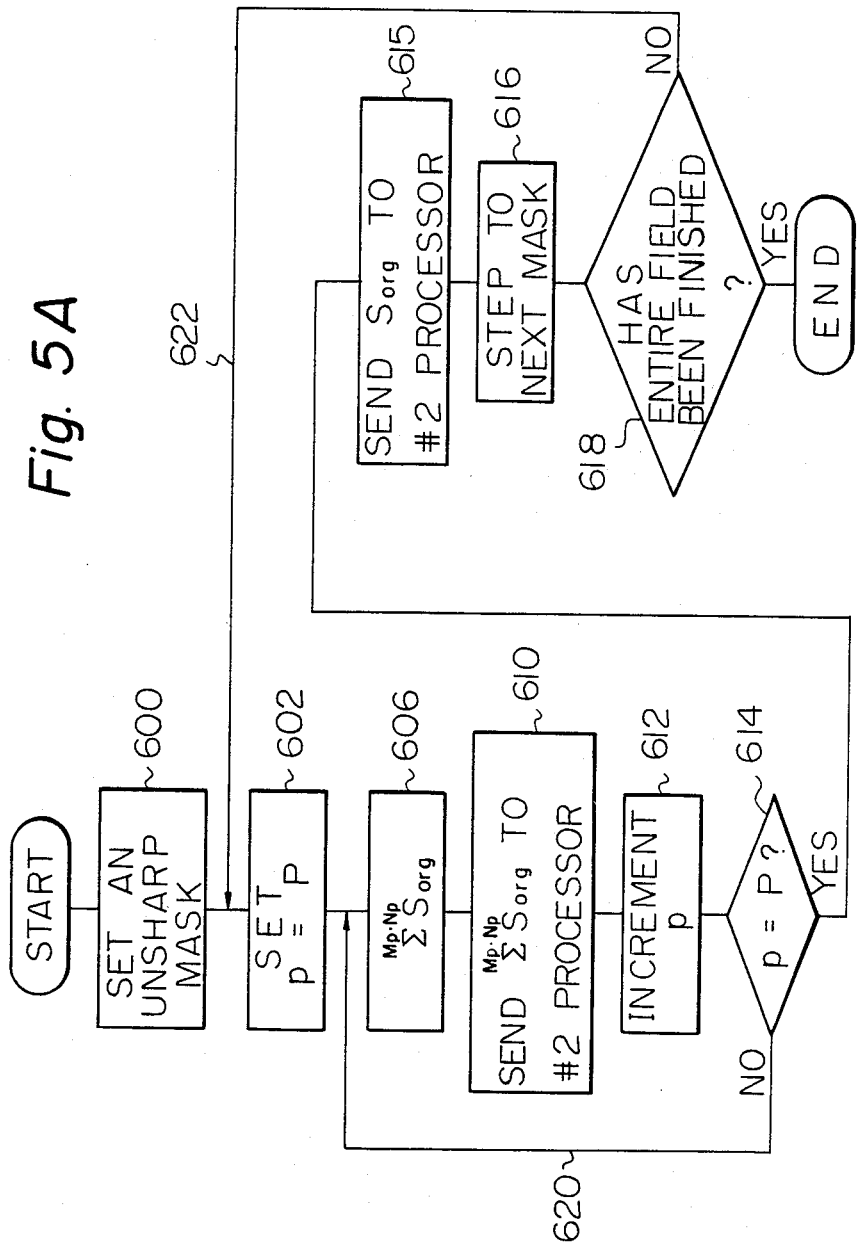

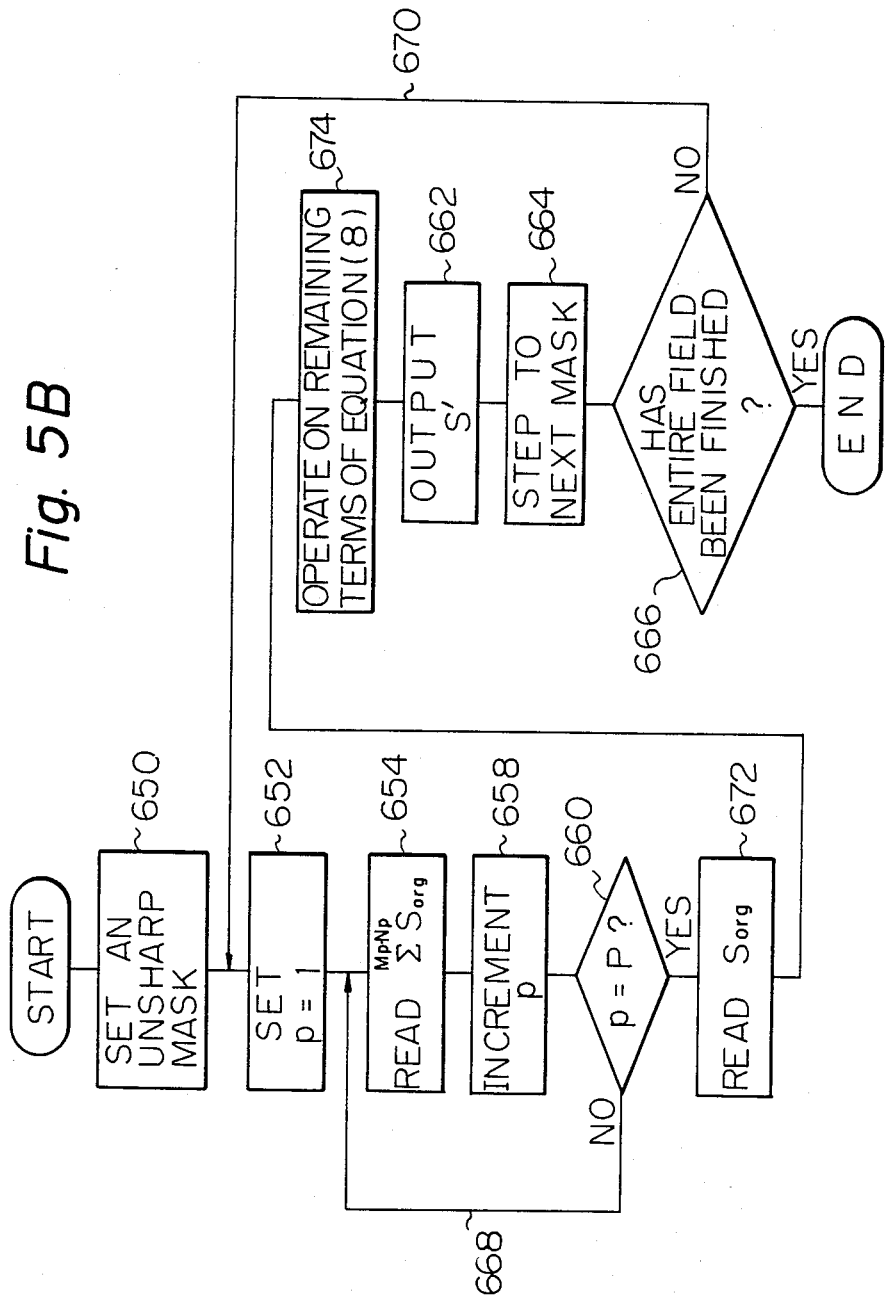

IMAGE PROCESSING FOR UNSHARP MASKING OF IMAGE

BACKGROUND OF THE INVENTION

1. Field of the Invention

The present invention relates to image processing, and more particularly, to image processing for use in reproducing an image from an original image with a frequency component or components emphasized which are higher than a specific spatial frequency.

2. Description of the Prior Art

In image processing, especially in a digital data processing, a so-called unsharp masking process may often be involved in which a spatial frequency component or components of a specific frequency band included in a digitalized video signal are enhanced so as to produce an image that is suitable for a specific usage. In a medical diagnosis, for example, there is a kind of radiation photography system using a stimulable phosphor sheet. In such a system, a radiation sensitive sheet, made of stimulable phosphor, is exposed to an imagewise radiation to store an original image therein, which is then read out by illumination of a stimulating ray to be recorded as a visible hard copy of image on a recording medium.

A latent image of an object under inspection, such as of a living body, which is temporarily stored in a sheet of stimulable phosphor as energy distributions of radiation, is scanned with a stimulative light beam to cause secondary emission of light from the sheet in dependence upon the stored latent image. The secondary emission of light from the phosphor sheet is in turn converted into an electrical signal indicative of the image. The electrical signal is converted into a digital form, which is then processed so as to cause a specific frequency component or components to be emphasized, effecting enhancement in sharpness of edge portions of the image. In a medical diagnosis, for example, such unsharp masking may advantageously be used to produce an easily readable picture of blood vessels or foci, for example, with a fine gray scale tone emphasized.

More specifically, according to Japanese Patent Laid-Open Publication No. 163472/1980, for instance, a video signal S' which has been processed under unsharp masking is represented by the following expression:

$$S' = S_{org} + \beta(S_{org} - S_{us}), \quad (1)$$

where $S_{us}$ is an unsharp masking signal associated with a very low spatial frequency, or infralow frequency, which is obtained at sampling points, or pixels, in scanning lines formed by scanning a stimulable phosphor sheet having a latent image stored therein with a stimulative ray in raster fashion, $S_{org}$ is an original video signal readout from the stimulable phosphor sheet, and $\beta$ is an emphasizing coefficient.

It is to be noted that the unsharp masking signal $S_{us}$ is available from scanning points on an unsharp image, or unsharp masking, into which the original image has been processed so as to only include frequency components lower than such an infralow frequency component. In addition, the words "original video signal" may also include a signal which is resultant from an image processing which is common in the art, such as nonlinear (e.g. logarithmic) amplification for nonlinearity compensation or band suppression. Also, the emphasizing coefficient $\beta$ may be a constant, and in general may also be a function $\beta(S_{org}, S_{us})$ of the original video signal $S_{org}$ and the unsharp masking signal $S_{us}$.

According to Japanese Patent Laid-Open No. 75139/1981, when a latent image stored in a stimulable phosphor sheet is scanned in raster fashion, the unsharp masking signal $S_{us}$ may be derived from averaging by simple addition the original signals $S_{org}$ at the scanning or sampling points in a rectangular region formed by two straight lengths of line, parallel to scanning lines, and two straight lengths of line, perpendicular to the scanning lines. Assuming that, for example, an area or region of an original image is scanned which includes N scanning lines with each scanning line including M sampling points or pixels, then the unsharp masking signal $S_{us}$ is got from the following expression:

$$S_{us} = \frac{\sum\limits^{M,N} S_{org}}{M \cdot N}. \quad (2)$$

Combining the expressions (1) with (2), unsharp masking process depends upon the following expression:

$$S' = S_{org} + \beta \left( S_{org} - \frac{\sum\limits^{M,N} S_{org}}{M \cdot N} \right). \quad (3)$$

Generally, $\beta$ may be a function of $S_{org}$ and $S_{us}$, and the expression (3) may in general be expressed by the following formula:

$$S' = \gamma \left[ S_{org} + \beta(S_{org}, S_{us}) \left( S_{org} - \frac{\sum\limits^{M,N} S_{org}}{M \cdot N} \right) \right], \quad (4)$$

where $\gamma$ is a nonlinear function for use in a known gradation conversion.

Specifically, in the case of the number M of sampling points in a scanning line equal to the number N of the scanning lines in the rectangular region discussed above, the expression (4) will be transformed into $$S' = \gamma \left[ S_{org} + \beta(S_{org}, S_{us}) \left( S_{org} - \frac{\sum\limits^{N^2} S_{org}}{N^2} \right) \right]. \quad (5)$$

The operations in accordance with expressions (3), (4) and (5) are substantially not different from an ideal masking operation with respect to improvement in medical diagnostic performance of radiation images, and in addition include an averaging by simple addition, resulting in shortening an operational period of time as well as simplifying the system configuration for image processing.

In the operations in accordance with formulae (3), (4) and (5), it takes as much time for operations of summing the original video signals with respect to the entire pixels involved in a rectangular area, namely, $$\sum\limits^{M,N} S_{org} \text{ or } \sum\limits^{N^2} S_{org},$$

as for that of the remaining portions of the formulae (3), (4) and (5).

As depicted in FIG. 3, for example, a square mask 500 is formed by four sides of equal length including N pixels each, with horizontal scanning made in the direction of the arrow H and vertical scanning in the direction of the arrow V. A total optical density $C_i$ resultant from summation of an optical density $S_{i,j}$ of a pixel (i,j) in the direction of the arrow V is represented by the formula:

$$C_i = \sum_{j=b-(N-1)/2}^{b+(N-1)/2} S_{i,j}, \qquad (6)$$

where the pixel at the center of mask 500 is represented by (a,b) in the coordinates. The total density T with respect to the entire mask 500 is then given by $$T = \sum_{i=a-(N-1)/2}^{a+(N-1)/2} C_i \qquad (7)$$

During the scanning of the n-th line, the scanning beam reaches pixel (m,n), so that the unsharp masking operation is shifted from $S_{m-1,n}$ to $S_{m,n}$. The operation is performed by reading the optical density $S_{m,n}$ to add it to the sum density resultant from totalizing or accumulating the densities on the preceding pixels to the pixel (m,n) on the m-th column, with subtraction from the sum density made of the optical density of pixel (m,n−N) on the m-th column, which pixel has gone out of mask 500 due to the shift of operation. Namely, this operation is indicated by the following expression:

$$C_m \leftarrow C_m + S_{m,n} - S_{m,n-N}$$

Successively, from the total density resultant from the preceding masking operation, subtracted is the sum density $C_{m-N}$ of the pixels in the (m−N)th column which has not been included in mask 500, with the sum density $C_m$ of the pixels in the m-th column added which is newly involved therein. This is represented by the following expression:

$$T \leftarrow T + C_m - C_{m-N}$$

Using T thus obtained and original video signal $S_{org}$, unsharp masking operations will be performed on mask 500.

Following table I shows an example of operational periods of time during which addition operations with respect to an unsharp masking were executed by a bit-slice type microprocessor in which it takes one microsecond for reading/writing and addressing a storage location, 0.3 microsecond for addition and subtraction each, 0.9 microsecond for multiplication, and 3 microsecond for division. In Table II, operational periods of time for emphasis and gradation processing with respect to $\beta$ and $\gamma$ are also shown. Additionally, the microprocessor used had a storage including a table which defines an emphasizing function $\beta$ and a nonlinear function for gradation conversion $\gamma$. It should be noted that the period of two microseconds required for transferring data was specific for the system in accordance with the present invention.

As clear from those tables, it takes comparable periods of time for executing the additions with respect to the unsharp masking and for processing emphasis and gradation. To the respective operations, a small period of time is inpractice added which is necessary for error control, periphery processing of a frame, and timing control between the image reader and the image recorder. In any case, however, it took 25–30 microseconds for image processing per unit pixel.

TABLE I

| | |
|---|---|
| Read $S_{m,n}$ | 1 microsecond |
| Write $S_{m,n}$ | 1 |
| Read $C_m$ | 1 |
| Read $S_{m,n-N}$ | 1 |
| $C_m \leftarrow C_m - S_{m,n-N}$ | .3 |
| $C_m \leftarrow C_m + S_{m,n}$ | .3 |
| Write $C_m$ | 1 |
| Read $C_{m-N}$ | 1 |
| $T \leftarrow T - C_{m-N}$ | .3 |
| $T \leftarrow T + C_m$ | .3 |
| Read $S_{org}$ | 1 |
| Transfer $S_{org}$ and sum | 2 |
| Total | 10.2 microseconds |

TABLE II

| | |
|---|---|
| Transfer(Read) $S_{org}$, sum | 2 microseconds |
| Division $\alpha \leftarrow$ sum/$N^2$ | 3 |
| $\Delta \leftarrow S_{org} - \alpha$ | .3 |
| Overflow and underflow control during calculation steps | 2 |
| Read $\beta(S_{org}, S_{us})$ | 1 |
| Multiply $\beta(S_{org}, S_{us})$ with $\Delta$ | .9 |
| $S_{org} + \beta(S_{org}, S_{us}) \times \Delta$ | .3 |
| Read $\gamma$ table | 1 |
| Write memory | 1 |
| Total | 11.5 microseconds |

In a radiation photography system using stimulable phosphor sheets, or image storage panels containing stimulable phosphor, on which images have been stored at radiation exposure sites or stations are collected to an image processing station or center, in which information on the stored images are read out from the thus collected storage panels to be data processed for reproduction as easily recognizable images. It is required for the image processing systems provided in the center to deal with a huge amount of image data for a very short period of processing time. It is therefore advantageous for those image processing systems to execute operations on such unsharp masking during as short period of time as possible.

It is therefore an object of the invention to provide an image processing system which is capable of processing unsharp masking on a real-time basis in a shortened period of operational time with respect to a large amount of image data.

SUMMARY OF THE INVENTION

In accordance with the present invention, an image processing system comprises video signal input means for receiving an original video signal $S_{org}$ associated with a pixel involved in an image under processing, the original video signal $S_{org}$ being formed by scanning the image under processing, operational circuitry interconnected to said input means for executing an unsharp masking processing in accordance with an expression defined by $$S' = \gamma \left[ S_{org} + \beta(S_{org}, S_{us}) \left( S_{org} - \sum_{p=1}^{P} \frac{\alpha_p M_{p\Sigma} \cdot N_{pS_{org}}}{M_p \cdot N_p} \right) \right],$$

to produce a resultant signal S' with respect to a rectangular area formed by $N_p$ scanning lines each including $M_p$ pixels and defined by two lengths of line which are substantially parallel to the direction of a scanning line and two lengths of line which are substantially perpendicular to the direction of a scanning line, where $\alpha_p$ is a weight, $\alpha$ is an amphasis function, $\beta$ is a nonlinear function, $M_p$, $N_p$ and P are a natural number, and p is one of P, video signal producing means interconnected to said operational circuitry for producing the signal S′ calculated from the expression as a video signal to be reproduced of the image under processing, wherein said operational circuitry includes first and second processors interconnected with each other, said first processor executing operations on the term $$M_{p\Sigma} \cdot N_{pS_{org}}$$

in the expression sequentially with respect to the rectangular areas of the image under processing to transfer the results $$M_{p\Sigma} \cdot N_{pS_{org}}$$

and the associated original video signals to said second processor, said second processor being in response to the results $$M_{p\Sigma} \cdot N_{pS_{org}}$$

and the associated original video signals $S_{org}$ to execute operations on the remaining portions of the expression sequentially with respect to the rectangular areas to form the signal S′ to be reproduced.

BRIEF DESCRIPTION OF THE DRAWINGS

The other objects and features of the present invention will become more apparent from a consideration of the following detailed description taken in conjunction with the accompanying drawings in which:

FIGS. 5A and 5B show generic control flows executed by the image processing system shown in FIG. 2.

DESCRIPTION OF THE PREFERRED EMBODIMENT

Figure 1:
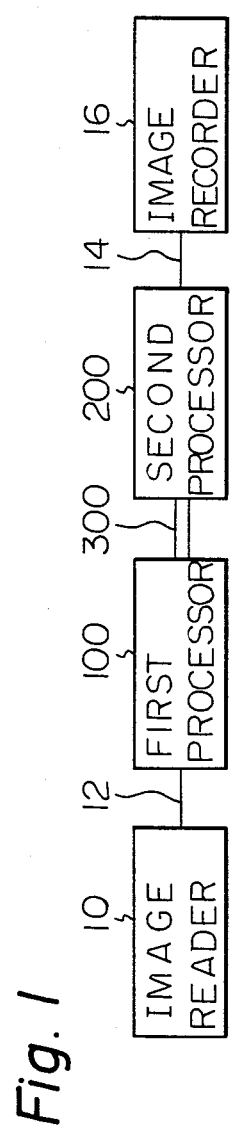
FIG. 1 depicts schematically the general cofiguration of an image processing system in accordance with the present invention in the form of a block diagram.

With reference to FIG. 1, an image processing system in accordance with the present invention includes an image reader 10 for sensing an image under processing, or original image, which may be a radiation image of an object to be inspected, stored in a sheet of stimulable phosphor in the form of distributions of radiation energy, for example. Although the description will be made on an illustrative embodiment directed to radiation image processing, images which can be dealt with in accordance with the invention may be in any form of images, having gray scales such as of remotely sensed images. In an exemplary radiation photography system employing stimulable phosphor as an intermediate or temporary image storage, reader 10 senses an original image stored in a stimulable phosphor sheet under page scanning in a raster fashion with an illuminating stimulative light beam to produce time-serial video signals on its output 12.

Output 12 from image reader 10 is interconnected to a first processor system 100, which may be a microcomputer. Processor system 100 performs operations on the additions $$\underset{\Sigma}{M_pN_{Sorg}} \text{ or } \underset{\Sigma}{N^2_{Sorg}}$$

included in the term of the expressions (3,) (4) and (5) an unsharp masking process with respect to an unsharp mask, which is one of rectangular areas of an image under processing.

First processor system 100 is interconnected to a second processor system 200 by a connecting device 300, which may include a common bus system for coupling data buses and control lines between both of processor systems 100 and 200, for example. Second processor system 200, which also may be a microcomputer, receives the results from the additions performed in first processor system 100 together with the original video signals $S_{org}$ via connecting system 300 with respect to each unsharp mask, to operate on the remaining terms of the aforementioned unsharp masking expressions (3) (4) and (5). In accordance with the present invention, first and second processor systems 100 and 200 are therefore in the form of a processor complex, such as of a pipeline structure, in which operational functions are shared between the processors.

Second processor system 200 has an output 14 interconnected to an image recorder 16. Second processor system 200 produces operational results from output 14, in response to which image recorder 16 will reproduce a visual image on a recording medium as a hard copy of the processed image.

Figure 2:
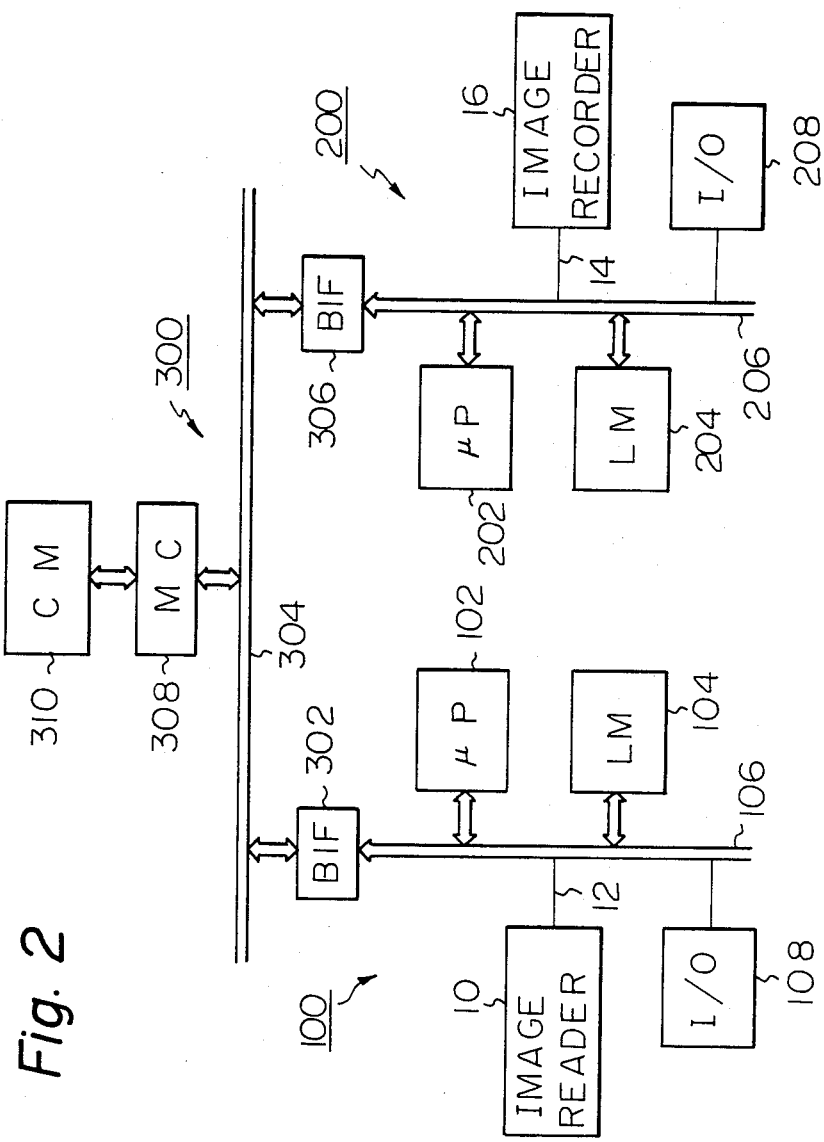
FIG. 2 shows in a schematic block diagram an embodiment of the system shown in FIG. 1, which is implemented by microcomputers.

In FIG. 2, there is shown an embodiment of an image processing system which is implemented by a couple of microprocessors. In the figure, the like components are designated by the same reference numerals as in FIG. 1.

With reference to FIG. 2, first processor system 100 includes a processing unit ($\mu$P) 102, and a local memory unit (LM) 104 having a random access memory (RAM) and a read-only memory (ROM), etc. Processing unit 102 and local memory 104 are interconnected to a data bus 106, to which the aforementioned image reader 10 is interconnected together with an input/output device (I/O) 108, such as a keyboard and a display unit.

Second processor system 200 may be substantially of the same system configuration as first processor system 100, and the corresponding elements are designated by reference numerals having a two-handredth digit with the tenth and unit digits thereof corresponding to those of first processor system 100. It will be appreciated that to a data bus 206 of processor system 200 interconnected is image recording unit 16, instead of image reader 10 in first processor system 100. For simplicity of illustration, control connections between the elements are omitted from the figure.

Data bus 106 of first processor system 100 is connected to a common bus system 304 via a bus interface (BIF) 302, which controls over interference and hogging which would otherwise occur between the bus systems. Similarly, data bus 206 of second processor system 200 is also connected to common bus system 304 via another bus interface 306.

In the illustrative embodiment, a common memory unit (CM) 310 is also coupled to common bus 304 by means of a memory control (MC) 308, which controls over interference and hogging between the storage units. Common memory 310 is accessible by either of processor systems 100 and 200 to temporarily store therein the operational results obtained from first processor system 100, which results thus stored in locations of storage 310 can be fetched by second processor system 200. In the system shown in FIG. 2, transfer of data from first processor system 100 to second processor system 200 is made by means of common storage 310 and the associated circuits therewith. However, other techniques for transferring data between processors are of course applicable to the image processing system. For example, both processor systems 100 and 200 may be adapted to communicate directly with each other between bus interfaces 302 and 306 without using common storage 310.

Processor 102 of first processor system 100 controls image reader 10 to scan and sample all pixels, for example M·N pixels, involved in an unsharp masking on an image to be inspected, in a raster scanning fashion to form original video signals $S_{org}$. Processor 102 fetches the original video signals $S_{org}$, which will in turn be added or sccumulated successively. When completing the successive additions of the original video signals associated with the M·N pixels involved in that unsharp mask, processor 102 then forwards the sum results $$\underset{\Sigma}{M \cdot N} S_{org}$$

as well as the original video signals $S_{org}$ onto common bus 304, which will in turn be stored in the locations of common storage 310. Subsequently, processor 102 proceeds the similar operations on the succeeding unsharp mask on the image under processing.

Processor 202 of second processor system 200 reads out the operational results $$\underset{\Sigma}{M \cdot N} S_{org}$$

together with the original video signals $S_{org}$ associated with an unsharp mask on the image under processing from the storage locations of common memory unit 310 to in turn operate on the remaining terms of the expression (4), for example, with respect to the data readout. The resultant data S' from the operations performed in processor 202 is stored in local storage 204 of second processor system 200 to be subsequently read out therefrom for reproduction on image recording unit 16 as a visual image on which unsharp masking has been processed.

Description has been made on an illustrative embodiment performing unsharp masking operations by an averaging by simple addition in accordance with expressions (3) (4) and (5). More generally, however, the present invention is also applicable to unsharp masking operations by means of averaging by weighted addition with respect to a plurality of masks of different sizes at a position of an original image.

Figure 4:
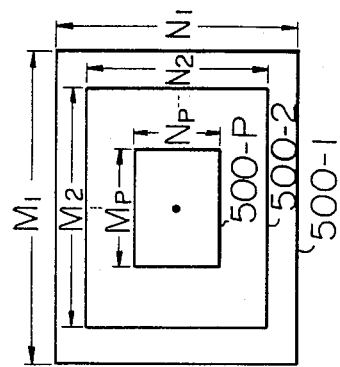
FIG. 4 illustrates masks for use in an unsharp masking process in accordance with averaging by weighted addition.

As shown in FIG. 4, for example, assume P similar, rectangular areas or masks 500-1, 500-2, . . . , 500-P including $N_1, N_2, \ldots, N_p$ scanning lines, respectively, each of which contains $M_1, M_2, \ldots, M_p$ pixels, respectively, where P is a natural number. The expression for unsharp masking for those masks corresponding to the aforementioned expression will become as the following:

$$S' = \gamma \left[ S_{org} + \beta(S_{org}, S_{us}) \left( S_{org} - \sum_{p=1}^{P} \frac{\alpha_p M_{p\Sigma} \cdot N_{pS_{org}}}{M_p \cdot N_p} \right) \right], \quad (8)$$

where $\alpha_p$ is a weight with respect to respective rectangular masks 500-1, 500-2, . . . , 500-P.

In accordance with expression (8), addition or accumulation of the original video signals $S_{org}$ is performed to obtain $$M_{p\Sigma} \cdot N_{pS_{org}},$$

with respect to each of masks 500-1, 500-2, . . . , 500-P, which will then be multiplied with a weight $\alpha_p$. Averaging the results over those P masks causes unsharp masking signal $S_{us}$ to be produced. For instance, the expression (8) is transformed into the expression (3) by putting P = 1 and $\alpha_p = 1$. The unsharp masking operations under averaging by weighted addition results in producing an image in which a plurality of different spatial frequencies are emphasized.

In the illustrative embodiment described with reference to FIGS. 1 and 2, an unsharp masking in accordance with the expression (8) proceeds along the following process. First processor system 100 executes P times the additions defined by the term $$M_{p\Sigma} \cdot N_{pS_{org}}$$

in the expression (8). That is, the accumulation of the original video signals $S_{org}$ is performed on the all pixels involved in the p-th mask 500-p with the parameter p incremented from 1 to P, inclusive. The resultant total value is transferred to second processor system 200, which in turn performs the operations on the remaining terms of the expression (8).

Figure 3:
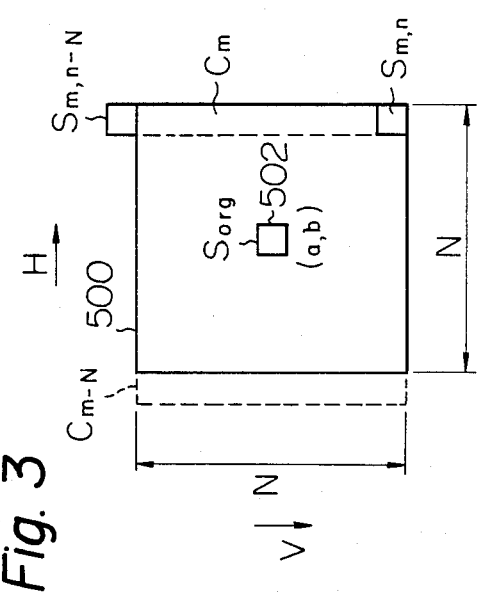
FIG. 3 illustrates an unsharp control maks, being useful for understanding the process for unsharp masking.

More specifically, with reference to FIGS. 5A and 5B, showing examples of control flows performing the operations in accordance with equation (8) by first and second processor systems 100 and 200, respectively, first processor 102 firstly sets the first unsharp mask (box 600, FIG. 5A), and also sets p to unity (602). Then, the first processor 102 executes the readout of the original video signals $S_{org}$ and the summation thereof to get the results $\Sigma S_{org}$ until the operations reach $M_p$ and $N_p$ (606). Upon reaching $M_p$ and $N_p$, first processor 102 forwards the results $\Sigma S_{org}$ to second processor system 200 (610), and thereafter increments parameter p (612). Until the parameter p gets to P, processor unit 102 repeats the operations by transferring the control to box 606 along line 620. When the parameter P becomes equal to P, processor unit 102 transfers the original video signals $S_{org}$ to second processor system 200 (615), and the control in turn advances to the next unsharp mask (616) to repeat the accumulation of the original video signals $S_{org}$ along line 622 until the whole field of the original image is completed (618). It will now be reminded that, as described with reference to FIG. 3, the masking operations $\Sigma S_{org}$ may be performed by using substantial portions of the operational results obtained from the masking operations made on the preceding masks, only with an original video signal $S_{org}$ incorporated which is directed to pixels newly included in the mask in interest, and with an original video signal $S_{org}$ excluded which is directed to pixels that have gone out of the mask in interest. It may therefore be appreciated that the masking operations along the sequences including the repetition loop 622 may be performed by using the resultant data from the preceding masks without reading out again all original video signals $S_{org}$ on the entire dots involved in the mask in interest.

By the way, the second processor 202 receives the data $\Sigma S_{org}$ resultant from the operations performed in first processor 102 with respect to P unsharp masks (boxes 654, 658, 660 and line 668 FIG. 5B). Second processor 202 receives original video signals $S_{org}$ (672) to execute the remaining portions of the operations in accordance with the equation (8), bos 674. Those operations will continue with respect to P unsharp masks of the position in question in the image to produce the results S' on image recorder 16, or store them in local storage 204 for succeeding use thereof (662). The operations will advance to the subsequent unsharp mask and repeat until they have been finished over the entire field of the original image (666, 670).

The image processing system in accordance with the present invention thus includes a couple of processor systems which are interconnected in cascades logically to each other. The one processor system in the former stage performs additions of pixel data with respect to unsharp masks to transfer the data resultant from the additions to the other processor system in the latter stage. While the one processor system in the preceding stage performs the additions of the pixel data on the subsequent unsharp mask, the other processor system in the latter stage executes the remaining operations on the previous unsharp mask using the resultant data transferred from the one processor system.

Addition or accumulation of original video signals with respect to unsharp masks performed in the one processor system is comparable in time with emphasis and gradation control performed in the other processor system, as recalled from the previous discussion. The operational burden in the unsharp masking process will be shared by those two processing systems, giving rise to increase in the operational speed in the total system. The image processing system may therefore be adapted to process the unsharp masking on a real-time basis in response to reading pixel data associated with respective unsharp masks over an image to be processed, so as to reproduce a visual copy of the thus processed image on a real-time basis.

In the case of the example described above, the addition on unsharp masking, and emphasis and gradation control were executed in the period of 13-15 microseconds per unit pixel, which is approximately twice as much in operational speed as in the case of the prior art, single-processor system. In the case of averaging by weighted addition for unsharp masking operation, the operational period of time per unit pixel is approximately P times as much as in the case of the averaging by simple addition, if the number P of masks is not significantly large. In comparison with the prior art system, however, the operational time is improved about half as much.

In the illustrative embodiment, the two processor systems share the burden of unsharp masking processing between accumulation of pixel data and operations on the remaining operations. This share is convenient in understanding logical construction, particularly in software configuration between the two systems of processing units, resulting in facilitating program sequences therefor to be manufactured and modified.

While there has been described and shown above an illustrative embodiment of the present invention, it will be appreciated that the invention is not restricted thereto. Accordingly, all variations, modifications and equivalent arrangements within the scope of the attached claims should be considered within the scope of the invention. For example, the invention is applicable to other types of images having gray scales, such as remotely-sensed images, in addition to X-ray photography. Also in addition to real-time image processing as described above with reference to the illustrative embodiment, it is advantageously applicable to images stored in the form of digital data in a large-capacity storage medium, such as magnetic disk.

What we claim is:

1. An image processing system comprising:

video signal input means for receiving an original video signal $S_{org}$ associated with a pixel involved in an original image, the original video signal $S_{org}$ being formed by scanning the original image;

operational circuitry interconnected to said input means for executing an unsharp masking processing in accordance with an expression defined by $$S' = \gamma \left[ S_{org} + \beta(S_{org}, S_{us}) \left( S_{org} - \sum_{p=1}^{P} \frac{\alpha_p M_{p\Sigma} \cdot N_{pS_{org}}}{M_p \cdot N_p} \right) \right],$$

to produce a resultant signal S' with respect to a rectangular area formed by $N_p$ scanning lines each including $M_p$ pixels and defined by two lengths of line which are substantially parallel to the direction of a scanning line and two lengths of line which are substantially perpendicular to the direction of a scanning line, wherein $\alpha_p$ is a weight, $\beta$ is an emphasis function, $\gamma$ is a nonlinear function, $M_p$, $N_p$ and P are a natural number, and p is one of P;

video signal producing means interconnected to said operational circuitry for producing the resultant signal S' calculated from the expression as a video signal to be reproduced of the original image;

wherein said operational circuitry comprises:

first and second processors interconnected with each other;

said first processor executing operations on the term $$M_{p\Sigma} \cdot N_{pS_{org}}$$

in the expression sequentially with respect to the rectangular areas of the original image to transfer the results $$M_{p\Sigma} \cdot N_{pS_{org}}$$

together with the associated original video signals $S_{org}$ to said second processor;

said second processor being in response to the results $$M_{p\Sigma} \cdot N_{pS_{org}}$$

and the associated original video signals $S_{org}$ to execute operations on the remaining portions of the expression sequentially with respect to the rectangular areas to form the resultant signal S'.

2. A system in accordance with claim 1, wherein the number P is equal to unity, and the weight $\alpha_p$ is equal to unity.

3. A system in accordance with claim 1, wherein said input means comprises image reading means for scanning the original image stored in a storage medium including stimulable phosphor in the form of distributions of radiation energy to sense the original image to produce the original video signal $S_{org}$.

4. A system in accordance with claim 2, wherein said input means comprises image reading means for scanning the original image stored in a storage medium including stimulable phosphor in the form of distributions of radiation energy to sense the original image to produce the original video signal $S_{org}$.

* * * * *